Oct. 31, 1950  C. F. DEGNER  2,528,300
CUTTING IMPLEMENT
Filed June 30, 1945  3 Sheets-Sheet 1
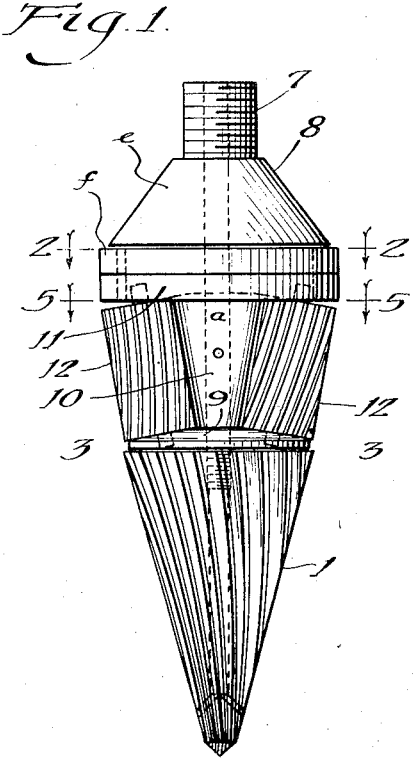
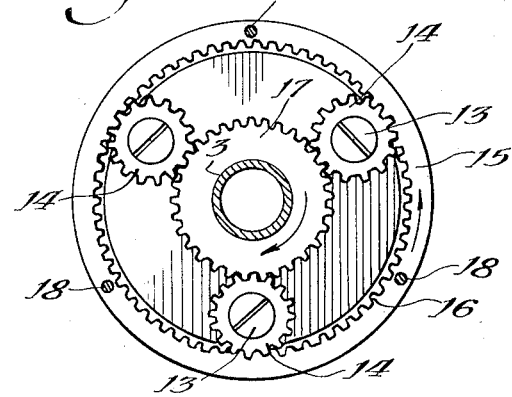
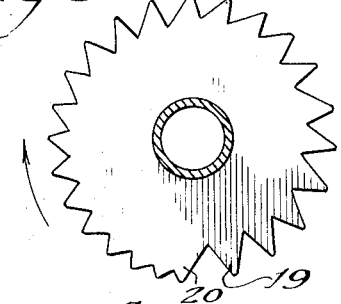
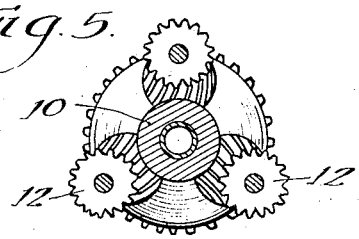
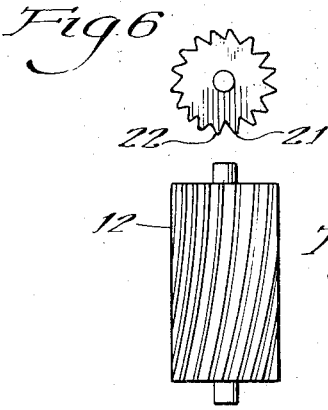
Inventor
By Charles F. Degner
Chritton, Wiles, Schroeder, Merriam & Hofgren
Attorneys Oct. 31, 1950  C. F. DEGNER  2,528,300
CUTTING IMPLEMENT Filed June 30, 1945  3 Sheets-Sheet 2

Inventor
Charles F Degner
By
Chritton, Wiles, Schroeder, Merriam & Hofgren
Attorneys Oct. 31, 1950     C. F. DEGNER     2,528,300
CUTTING IMPLEMENT
Filed June 30, 1945     3 Sheets-Sheet 3
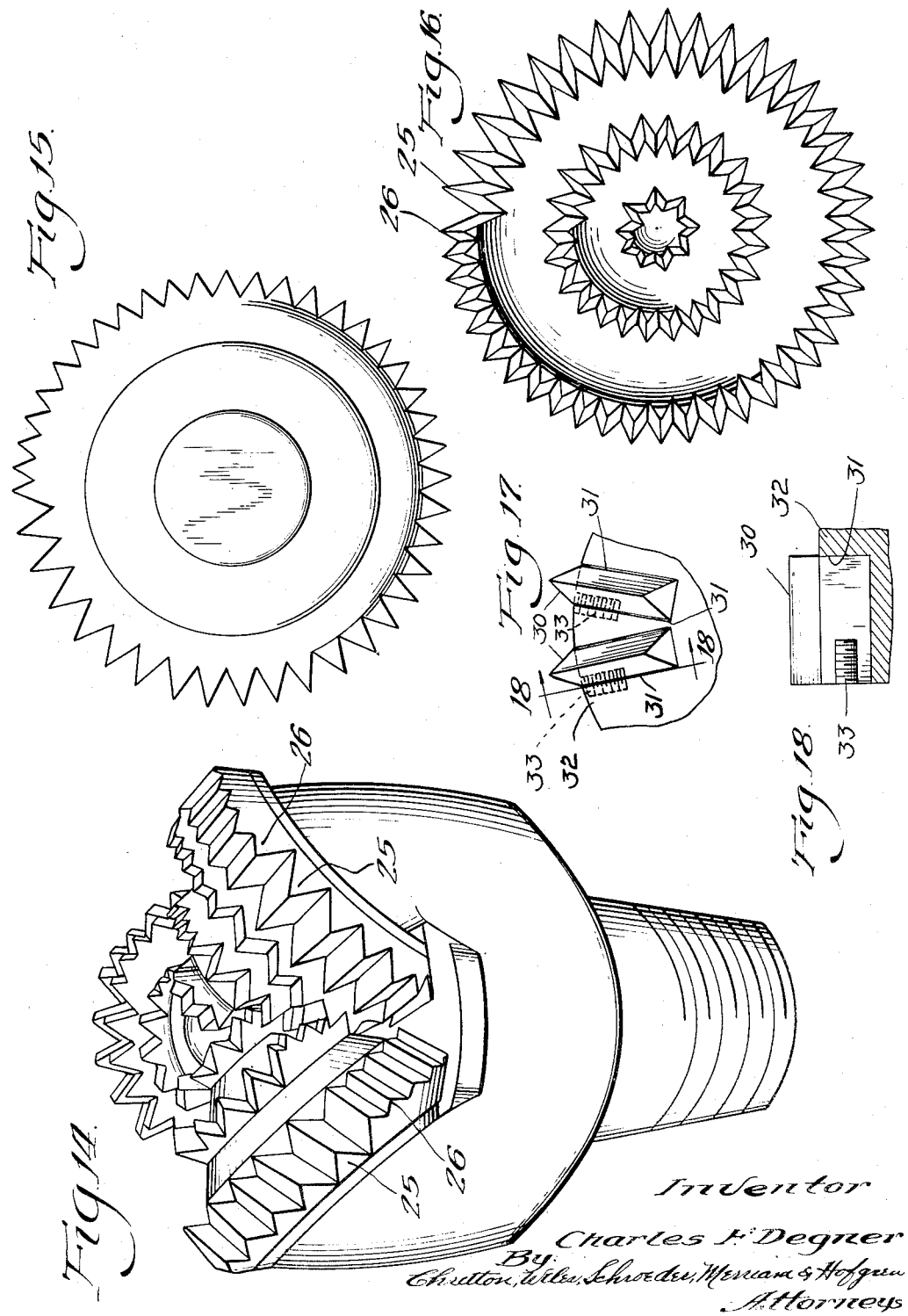
Inventor
Charles F. Degner
By
Chritton, Wiles, Schroeder, Merriam & Hofgren
Attorneys Patented Oct. 31, 1950

2,528,300

UNITED STATES PATENT OFFICE 2,528,300

CUTTING IMPLEMENT

Charles F. Degner, Chicago, Ill.

Application June 30, 1945, Serial No. 602,468

3 Claims. (Cl. 255—61)

This invention relates to cutting implements and more particularly such devices having a novel arrangement and construction of parts including an improved formation of cutting teeth.

The cutting implements of the present invention are capable of various uses and are applicable in different ways for the purposes intended. They may be effectively applied in the boring of holes in the earth for oil wells, water wells, and the like, as well as for locating and taking samples of minerals and other deposits in the earth. They may also be used for boring and reaming holes in various substances such as metal, wood, plastics, stone, and other hard or semi-hard substances. They may also be used in cutting lateral openings such as are cut by milling cutters and the like. In other words, cutting implements embodying my present invention are capable of such a wide variety of uses that I do not wish to be restricted in this regard other than as may be required by the prior art.

Among the objects of my invention are to provide a novel and improved cutting implement; to provide a cutting implement having cutting teeth of varying depths; to provide in a cutting implement cutting teeth progressively varying in depth around the cutting portion of the implement; to provide a novel form of earth boring implement; to provide a cutting implement of increased efficiency, one capable of more effectively cutting a better hole, and one having teeth capable of use in boring, reaming and as a milling cutter; and such further objects, advantages and capabilities, inherently possessed by my invention, as will later more fully appear.

My invention further resides in the combination, construction and arrangement of parts illustrated in the accompanying drawings and while I have shown therein, for illustrative purposes only, preferred forms of my invention, I wish it understood that the same are susceptible of modification and change without departing from the spirit of my invention.

In the drawings:

Fig. 1 is a side elevation of one form of cutting implement embodying my invention.

Fig. 2 is a transverse section on the line 2—2 of Fig. 1.

Fig. 3 is a transverse section on the line 3—3 of Fig. 1, on an enlarged scale.

Fig. 4 is a side elevation of Fig. 3 and showing the earth boring tool at the bottom of the form shown in Fig. 1.

Fig. 5 is a transverse section on the line 5—5 of Fig. 1.

Fig. 6 is a top plan view of one of the inclined cutters of Fig. 1.

Fig. 7 is a side elevation of Fig. 6.

Fig. 14 is a perspective view looking toward the cutting end of a boring tool showing another form of my invention.

Fig. 15 is a rear elevation of one of the cutting tools of Fig. 14.

Fig. 16 is a front elevation of one of the cutting tools of Fig. 14.

Fig. 17 is a fragmentary top view of a portion of a cutter having removable cutting teeth.

Fig. 18 is a vertical section on the line 18—18 of Fig. 17.

Figure 8:
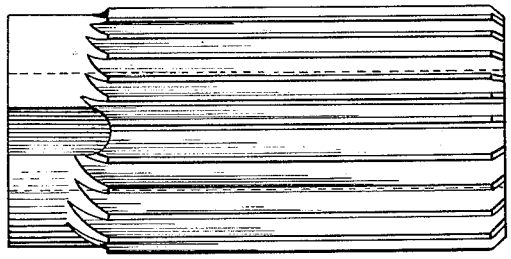
Fig. 8 is a side elevation of a reamer showing a modified form of my invention.

The broad idea of my invention resides in the provision of a cutting implement in which are provided one or more rotating cutting tools having cutting teeth that vary in size progressively around the cutting portion of the cutting tool. As seen in the various forms illustrated in the drawings these teeth vary in depth progressively around the cutting portion of the tool, and in the form shown in Figs. 10 and 11 also vary in diametrical width progressively around the cutting portion. This arrangement of the cutting teeth eliminates chattering of the tool during its cutting operation and greatly increases the efficiency of the cutting tool during its operation and produces a hole that is much more quickly formed and having a greatly improved surface on the interior of the finished hole.

Referring more in detail to Fig. 1, I have here shown a form of cutting implement for boring holes in the earth for any purpose desired such as boring oil wells, water wells, for taking samples of the contents of the earth through which the hole is made, and for any other purpose for which holes are bored in the earth, through stone and any other formation therein. The form of cutting implement shown in Fig. 1 comprises a lower boring tool 1 fixed by screw threads or the like 2, or any desired form of connection, to the rotatable stem 3, which stem is provided with a longitudinally extending hole 4 through which water, or any other desired liquid may be passed through the upwardly extending drill stem (not shown) from the top of the hole, openings 5 being provided to extend from the longitudinal hole 4 to the outside of the boring tool 1 to wash out cuttings and force them upwardly through the hole being bored. As shown in Fig. 4 hole 4 is preferably extended downwardly at 4' to near the lower end of the boring tool 1 for forcing liquid down to the end of the tip preferably through laterally extending holes 6, to force said liquid out near the end of the tip for washing away cuttings and the like.

The upper end of tube 3 is formed with an enlarged threaded neck 7 to be connected to the driving stem, extending upwardly through the hole, and by which the cutting implement is rotated. Fixed to threaded neck 7 and to the tube 3 is an outwardly tapering collar 8.

Rotatably mounted on tubular stem 3 directly above the boring tool 1 is a cutter-carrying cage comprising the lower conical shaped disk 9 fixed to the integral center cone 10 rotatably mounted on the stem 3, and the top disk 11 which is also fixed to the cone member 10. From the above it is seen that the cage just referred to is integrally formed as one piece, and has rotatably mounted therein with their axes at an angle to the vertical, the inclined cutters 12, which for illustrative purposes only I have shown in Fig. 5 as being three in number; however, I wish it understood that any number less than or greater than three of these cutters may be used as desired. These cutters 12 are rotatably mounted at their ends in the top and bottom disks 11 and 9 so as to rotate freely therein.

Rotatably mounted on the upstanding pins, screws or the like 13 in the top disk 11 are three pinions 14. Fixed to the upper surface of the disk 11 is a ring like member 15 having formed around its inner edge inwardly extending teeth 16 forming a ring gear the teeth of which intermesh the teeth of the pinions 14. Fixed to the tubular stem 3 is a gear 17 having teeth intermeshing with the teeth of pinions 14. The lower face of the conical collar 8 is directly above the ring gear teeth 16, pinions 14 and gear 17 to serve as a cover therefor. Rotation of the threaded neck 7, and stem 3 fixed thereto, also rotates pinion 17 which in turn rotates pinions 14 and ring gear 15. Ring gear 15 is fixed to disk 11 by pins or the like 18 to cause these parts to rotate together.

From the above it will be seen that as the tubular stem 3 rotates in the direction of the curved arrow shown in Fig. 2, gear 17 will rotate therewith in a clockwise direction as viewed in Fig. 2 which causes pinions 14 to rotate in a counterclockwise direction and in turn rotate the ring gear 15 in a counterclockwise direction.

From the above it is seen that rotation of the tubular stem 3 in a clockwise direction as viewed from the top will rotate the boring tool 1 in a clockwise direction and will rotate the cage 9—11 in a counterclockwise direction. During this action the boring tool 1 will advance downwardly as it bores the hole at this portion, and as the boring tool advances downwardly in the hole it will be followed up by the inclined cutters 12 which will rotate around the inside of the hole and as they move downwardly the helical teeth on the inclined cutters will, due to being rotated by the sides of the hole, cut the hole larger by rolling action of the cutting teeth against the sides of the hole, and thus cut the hole large enough to permit the disk 11, ring gear 15, and other parts thereabove to follow downwardly into the hole. The inclination of the cutters 12 and the helical arrangement of their cutting teeth will enlarge the hole in a novel and efficient manner as the inclined cutters roll around against the sides of the hole. It will be seen that the boring tool 1 rotates in one direction while the cage rotates in the opposite direction, but due to the rolling action of the inclined cutters 12 against the side of the hole the inclined cutters will rotate on their respective axes in the same direction of rotation as the boring tool, and as the inclined cutters are rotated in the hole they will be advanced downwardly in the hole due to the weight of the implement together with additional weight that will be applied to the drill stem above the surface of the ground, which additional weight may be as great as desired.

As seen in Fig. 3 the cutting teeth of the boring tool 1 vary in size progressively around the circumference of the cutting portion. For example, the tooth 19 is the larger one, this tooth having a greater depth. The next tooth is almost as large as tooth 19 but is a slight degree smaller and of less depth which is true of each of the succeeding teeth progressively around the circumference until the last tooth 20 is reached which is a slight degree smaller and of less depth than the preceding tooth. This same construction is also applied to the teeth of the inclined cutters 12 as seen in Fig. 6 in which the largest tooth is indicated at 21 and the smallest tooth at 22, it being understood as stated above that the size and depth of the teeth decrease from the tooth 21 progressively around the circumference to the tooth 22. This applies to each of the inclined cutters 12. This formation of teeth enables the more efficient cutting of a better hole and at the same time eliminates chattering.

Figure 9:
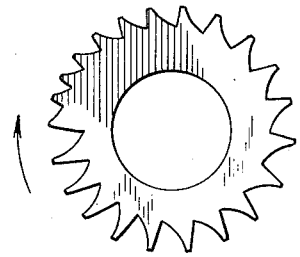
Fig. 9 is an end elevation looking toward the right hand side of Fig. 8.

The same structural feature of the progressively diminishing size and depth of teeth around the circumference applies also to the form of cutter shown in Figs. 8 and 9, this progressive change in size of the teeth being clearly shown in Fig. 9.

Figure 10:
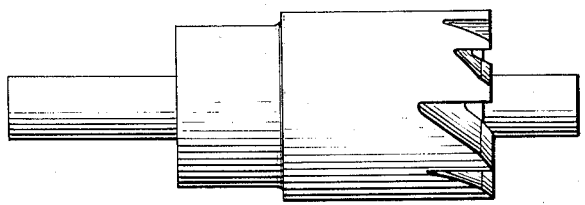
Fig. 10 is a side elevation of a counterboring tool showing a modified form of my invention.
Figure 11:
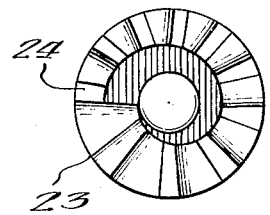
Fig. 11 is an end elevation looking toward the right hand side of Fig. 10.

The same also applies to the form of cutting implement shown in Figs. 10 and 11 in which the teeth not only progressively decrease in depth from the large tooth 23 to the small tooth 24, but they also progressively decrease in width from the large tooth to the small tooth as will be understood in Fig. 11.

Figure 12:
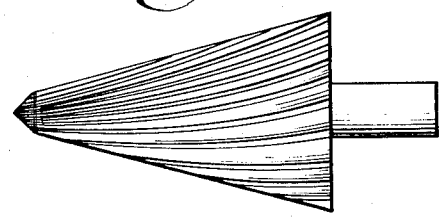
Fig. 12 is a side elevation of a burring reamer showing a further modification of my invention.
Figure 13:
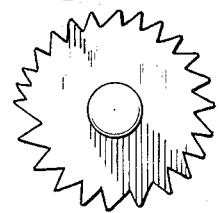
Fig. 13 is an end elevation looking toward the right hand end of Fig. 12.

The same also applies to the burring reamer shown in Figs. 12 and 13, in which the teeth, as in the cutting implement of Fig. 4, are also helically formed longitudinally.

The principle described above is present in the cutting teeth of the cutting implement shown in Figs. 14–16, which latter implement, while having the same structural features as to the progressively diminishing size of the teeth, operates by forcing the teeth vertically downward upon the surface of the material being acted upon under the action of very heavy weights being applied to the upper portion of the drill stem whereby, when the drill is rotated, the teeth will rotate about their respective axes and walk circularly around the hole, the cutting teeth cutting into the material being acted upon, under the pressure exerted by the heavy weights referred to above. In the form shown in Figs. 14–16 the large teeth of considerable depth are indicated at 25 and the small teeth at 26, the size and depth of the teeth progressively diminishing from tooth 25 to tooth 26.

The same also applies to the inner teeth of each of the cutters shown in Figs. 14 and 16.

In Figs. 17 and 18 I have shown the general principle described above as applied to teeth 30 which are removably mounted in slots 31 in the body portion 32 and releasably held therein by set screws 33, or the like, extending into threaded holes formed partly into the teeth and partly into the body portion to firmly hold the teeth in the slots. When it is desired to replace any one or all of the worn teeth with new and sharp teeth, it is only necessary to remove the screws 33 from their threaded holes, pull or drive the tooth or teeth out of the slot or slots, insert new teeth, and then insert the set screws into place. This enables the replacement of the worn teeth with new sharp teeth without having to throw away the body portion, hence with my invention is provided a great saving of expensive metal. A user may thus have on hand or obtain a number of extra teeth or bits and insert them when required, and then have the equivalent of a new tool.

Having described my invention, I claim:

1. A drilling implement comprising, a body having a cutting portion on the periphery thereof and extending longitudinally of said body, said cutting portion consisting of cutting teeth entirely around the outer circumference of said body, one of said teeth being of greater depth in the direction of rotation than the next trailing adjacent tooth, the remaining trailing teeth each being of slightly smaller depth progressively around the circumference of said body, with the tooth of the smallest depth lying adjacent the tooth of greatest depth and the locus of the tips of said teeth defining a circle circumscribed about the body and the locus of the roots of said teeth defining a spiral whereby to prevent tracking and chattering of the implement during the drilling operation.

2. A drilling implement for rock, earth or the like and of the roller cone type including a plurality of roller cone bodies, each cone body having formed thereon a plurality of cutting portions consisting of cutting teeth, one of said teeth being of greater depth in the direction of rotation than the next trailing adjacent tooth, the remaining trailing teeth each being of slightly smaller depth progressively around the circumference of said body with the tooth of smallest depth lying adjacent the tooth of greatest depth and the locus of the tips of said teeth defining a circle circumscribed about the body and the locus of the roots of said teeth defining a spiral whereby to prevent tracking and chattering of the implement during the drilling operation.

3. A drilling implement for rock, earth or the like and of the roller type including a plurality of roller bodies, each roller body having formed thereon a series of cutting portions consisting of cutting teeth extending entirely around the outer circumference of the roller body, one of said teeth being of greater depth in the direction of rotation than the next trailing adjacent tooth, the remaining trailing teeth each being of slightly smaller depth progressively around the circumference of said body with the tooth of smallest depth lying adjacent the tooth of greatest depth and the locus of the tips of said teeth defining a circle circumscribed about said body and the locus of the roots of said teeth defining a spiral whereby to prevent tracking and chattering of the implement during the drilling operation.

CHARLES F. DEGNER.

REFERENCES CITED

The following references are of record in the file of this patent:

UNITED STATES PATENTS

| Number | Name | Date |
| --- | --- | --- |
| 1,370,677 | Wooldridge | Mar. 8, 1921 |
| 1,391,626 | Gilthorpe | Sept. 20, 1921 |
| 1,393,613 | Elliott | Oct. 21, 1921 |
| 1,577,810 | Raymond | Mar. 23, 1926 |
| 1,579,888 | Raszl | Apr. 6, 1926 |
| 1,623,801 | Melling | Apr. 5, 1927 |
| 1,772,491 | Koppl | Aug. 12, 1930 |
| 1,961,819 | De Costa | June 5, 1934 |
| 2,003,793 | Sperry | June 4, 1935 |
| 2,029,399 | Try | Feb. 4, 1936 |
| 2,048,058 | Comeau | July 21, 1936 |
| 2,382,725 | Koppl et al. | Aug. 14, 1945 |